United States Patent [19]
Schmid et al.

[11] Patent Number: 6,013,758
[45] Date of Patent: *Jan. 11, 2000

[54] METHOD FOR PRODUCING A LIQUID SYSTEM FOR LACTAM POLYMERIZATION

[75] Inventors: Eduard Schmid, Bonaduz, Switzerland; Roman Eder, Filderstadt, Germany; Ivano Laudonia, Thusis, Switzerland

[73] Assignee: EMS-Inventa AG, Zürich, Switzerland

[ * ] Notice: This patent is subject to a terminal disclaimer.

[21] Appl. No.: 09/053,734

[22] Filed: Apr. 2, 1998

[30] Foreign Application Priority Data

Apr. 15, 1997 [DE] Germany .............. 197 15 679

[51] Int. Cl.[7] .............. C08G 69/08; C08G 73/10

[52] U.S. Cl. .............. 528/310; 528/312; 528/315; 528/316; 528/323; 528/324; 528/332; 528/335; 528/338; 528/349

[58] Field of Search .............. 528/310, 323, 528/312, 315, 316, 324, 340, 332, 335, 338, 349

[56] References Cited

U.S. PATENT DOCUMENTS

| | | | |
|---|---|---|---|
| 3,017,391 | 1/1962 | Tierney | 528/323 |
| 3,575,938 | 4/1971 | Mottus et al. | 528/323 |
| 4,614,792 | 9/1986 | Bongers et al. | 528/323 |
| 5,039,784 | 8/1991 | Canalini | 528/323 |
| 5,723,569 | 3/1998 | Sato et al. | 528/323 |
| 5,747,634 | 5/1998 | Schmid et al. | 528/315 |
| 5,756,647 | 5/1998 | Schmid et al. | 528/323 |
| 5,760,164 | 6/1998 | Schmid et al. | 528/310 |
| 5,864,007 | 1/1999 | Schmid et al. | 528/312 |

FOREIGN PATENT DOCUMENTS

| | | |
|---|---|---|
| 19602684 | 1/1996 | Germany . |
| 19603305 | 1/1996 | Germany . |

*Primary Examiner*—P. Hampton-Hightower
*Attorney, Agent, or Firm*—Browdy & Neimark

[57] ABSTRACT

A method for the production and use of a catalytically-acting liquid system is offered, which has no or only a small proportion of free lactam, and which is of low viscosity and good storage stability and which directly initiates the anionic lactam polymerization.

36 Claims, No Drawings

METHOD FOR PRODUCING A LIQUID SYSTEM FOR LACTAM POLYMERIZATION

FIELD OF THE INVENTION

The invention relates to a method for producing a liquid system for lactam polymerization, which directly initiates and performs anionic lactam polymerization. The invention further relates to the use of the liquid system.

BACKGROUND OF THE INVENTION

A activated anionic lactam polymerization is generally performed by the separate addition of a catalyst and an activator to the lactam melt, wherein the so-called two-pot method has gained acceptance in connection with many applications. Here, melt portions of equal volume are prepared, in which either a catalyst or an activator has been dissolved. These melts are combined for the accelerated initiation of the polymerization. Therefore the method requires two separate melt tanks for lactams containing dissolved substances, such as catalyst or activator, which are active at higher temperatures. Therefore the storage stability of the melts is significantly reduced.

The polymerization of lactam could be greatly simplified and more universally applied if it were possible to omit the provision of the lactam melt, respectively containing a dissolved catalyst and a dissolved activator, whereby its storage ability is reduced. This applies in particular to lactam-12, which only becomes liquid above 150° C.

The situation is further complicated by the fact that catalyst and activator must be supplied separately to the lactam melt. Thereby the catalyst generally is a solid, and many activators are also solids, so that polymerization must always be preceded by separate dissolving processes, during which the polymerization of the lactam can already start. This applies in particular to lactam-12 with its high melting point and the introduction of catalyst into the lactam melt.

If a catalyst containing lactam-6 is used for the polymerization of other lactams, copolymerisation occurs, although only in small amounts.

Since known catalysts for lactam polymerization are solids with a limited storage life, which for their use require a dissolving process in previously melted lactam, complicated solvent systems have been developed for making available a catalyst solution which is usable at least over a limited period of time, has a low slag formation tendency and preferably is liquid at room temperature. Examples for this are German Patent DE 22 30 732 C3 and European Patent EP 0 438 762 B1. However, even with these catalyst solutions being made available, the main disadvantage of the method remains, namely that the activator and the catalyst must respectively be added separately to the lactam melt for a fast and predetermable activated anionic lactam polymerization.

Thus there is a proven requirement to considerably simplify the activated anionic lactam polymerization, to make it more secure in its technical feasibility and to perform it with fewer process steps.

The supply of a storagestable liquid system, which contains only a little or no free lactam, which directly initiates the activated anionic lactam polymerization and permits it to take place in a discontinuous or a continuous process, would represent a very important technical progress.

OBJECT AND SUMMARY OF THE INVENTION

The object of the invention therefore is a method for the production of a liquid system for initiating and performing lactam polymerization, which allows the production of a liquid system by means of only a few method steps, in particular contains no or only small amounts of free lactam and is distinguished by a low viscosity and good storage stability, i.e. remains of low viscosity and active on storage and, when only a small volume-fraction is added to a lactam melt, initiates, performs and terminates the lactam polymerization in a few minutes when the temperature is suitably regulated, and therefore is qualified for continuous and discontinuous processes.

This object is attained by means of the method for producing a liquid catalytically acting system for performing the lactam polymerization wherein in at least one liquid, polar, aprotic solvating agent (S), which contains no structural elements capable of condensation, a composition is formed, that at the same time executes the actions of a catalyst and an activator, by variation of temperature, under inert gas atmosphere and with exclusion of moisture by the steps of (i) dissolving at least one lactam (L) in the solvating agent (S), (ii) adding at least one strong base (B) and reacting it with the at least one lactam (L) to form lactamate, (iii) adding at least one activator (A) and reacting it with the lactamate, and (iv) cooling down the reaction product. An other object is its preferred use in processes for producing parts of polylactam and composites with a polylactam-matrix.

Production takes place by the reaction of a lactam in stoichiometric or almost stoichiometric proportion with a strong base in a solvatingly acting, liquid, aprotic compound, i.e. the solvating agent (S), to form a lactamate, to which an activator is subsequently added before the solution of the resulting compound is cooled from the temperature to room temperature.

Further additives can then be added in any arbitrary process step.

Thus, the inventive concept of the method for producing a liquid system for performing the lactam polymerization lies in the inclusion of the lactamate synthesis in the course of producing the liquid system, consisting of a composition of catalyst and activator in an aprotic solvating agent, whereby the large amount (approximately 80 weight-%) of unreacted lactam can be avoided which, in the prior art, is used as solvent for the effective lactamate-fraction.

Solvating agents are organic compounds with aliphatic, cycloaliphatic and aromatic structural elements, hetero atoms and hetero groups, for example:
—O—, —CO—, —SO$_2$—, —CONR—, —COO—, —NRCOO—, —NO—, —RNCONR—, phenolether, —NR—, P(OR)$_3$, and PO(OR)$_3$,
which act solvatingly.

The dashes at the structural elements mean a linkage to a radical which is not H and cannot enter into a condensation reaction with water being split off.

R is a radical which is different from hydrogen, in particular an alkyl radical.

The solvating agent can contain several of the listed structural elements. However, the listed structural elements should be considered to have been provided by way of example.

The solvating agent (S) is preferably an aprotic, aliphatic solvent.

Aprotic solvents are non-aqueous solvents, which do not contain an ionizable proton in the molecule.

Preferred representatives correspond to the general formula I

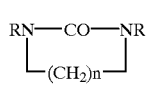

(I)

wherein R is an alkyl radical, in particular a methyl radical, and n=2 and 3.

Further representatives are tetraalkyl urea, tetraethyl urea and tetrabutyl urea, or N-alkylized carboxylic acid amides, for example, dialkylacetamide or dibutylformamide, or cyclic, N-alkylized carboxylic acid amides, for example N-alkyl pyrrolidone and N-alkyl caprolactam with preferably one alkyl radical with 1 to 8 C atoms, for example N-butyl-2-pyrrolidone, and in particular N-methyl pyrrolidone and N-methyl caprolactam.

In all cases the alkyl radicals can also contain hetero atoms, for example N-(3-methyloxypropyl)-2-pyrrolidone.

Further solvating agents (S) are liquid etherized polyols, for example with a basic structure $H_3C-O-(CH_2-CH_2-O)_n-CH_3$ of a molecular weights up to approximately 1500, as well as esterified polyglycols, for example di- and tri-ethylene glycol diacetate or liquid phthalic acid esters.

The solvating agent (S) requires the solvating structural elements for dissolving the lactam and, preferably at higher or advantageously also at room temperatures, the lactamate formed. It must be sufficiently heat-resistant to be used as a reaction medium for the lactamate formation and subsequent reaction with the activator to a compound and, in accordance with advantageous method variants, it must have a sufficiently high boiling point so as not to cause bubble formation in the lactam melt during its subsequent use for initiating the lactam polymerization. Solvating agents with boiling points between 80 and 300° C., preferably at least 200° C., are advantageously used. Finally, it must dissolve the formed compound of metal lactamate and activator at room temperature.

A method alternative, in particular for continuous polymerization process, is a solvating agent with a low boiling point, which lies between approximately 80 to 160° C., and which permits the continuous removal of the solvating agent following the addition of the liquid system to the lactam melt.

In further preferred variants, the solvating agent is a system of several components of, for example, low and high boiling point, or such with different application-specific properties. Besides a cyclic urea derivative, such a system can additionally contain, for example, a sterically hindered phenol, a fatty acid alkyloxazoline and/or a phthalic acid ester.

In the end product, such additional components can improve, for example, the resistance to heat, light and/or oxidation, or the demolding of the finished part.

On production of the system it is possible to dissolve additional components, which are solids, in the main component of the solvating agent prior of starting the reaction. It is essential in connection with their selection that they do not cause undesired side reactions during the lactamate formation and reaction with the activator and do not, or only slightly, interfere with the subsequent lactam polymerization.

It can be advantageous in many cases to employ a mixture of different active solvating agents which can be mixed with each other. For example, mixtures of cyclic ureas and/or acid amides are suitable, such as

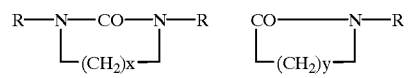

wherein R is, for example methyl, and x and y are selected such that a 5-, 6- or 7-membered ring is formed.

In this case the urea group, or respectively the amide group, preferably causes the solvating of the addition products of the lactamate to the compound A (carbodiimide, or respectively isocyanate), and the special polyether is used for the further liquefaction of the system and can aid, for example, in lowering the modulus of the polylactam by means of plasticizing.

The lactams (L) employed for the lactamate formation are advantageously those with 5 to 13 ring members, such as, for example butyrolactam, valerolactam, caprolactam, oenantholactam and laurinelactam. Here, lactams with 5 to 7 ring members, and caprolactam in particular, are preferred.

The strong bases (B) employed for the lactamate formation preferably have a higher basicity than the lactamate anion whose formation they cause.

Preferably employed bases (B) have an alkali, earth alkali or tetraalkylammonium cation, and an alkoxide, amide, hydride or an alkylate as anion, or they are Grignard compounds.

Examples are alkali and earth alkali metalalcoholates, in particular methylate and ethylate, such as, for example sodium methylate and -ethylate, or alcoholates of lithium, potassium and magnesium, or also tetraalkyl ammonium alcoholate, metal hydride, such as, for example sodium hydride, metal alkyles, for example such of butyl lithium, amide, such as, for example sodium amide, or also alkali and earth alkali metals which, for example, can be activated by means of iron(II) ions.

In special process variants the bases (B) are added as solution or suspension, for example in the solvating agent, or as small solid particles.

Carbodiimides, isocyanates and diisocyanates, which have an aliphatic, cycloaliphatic, aromatic or aliphatic-aromatic base structure, are preferred activators.

Examples are liquid isocyanates, such as, for example, toluylene diisocyanate and hexamethylene diisocyanate, and preferably also isocyanates and diisocyanates capped with lactam, as well as carbodiimides and polycarbodiimides. Suitable carbodiimides are, for example, N,N'-diisopropyl carbodiimide, N,N'-di-(o-tolyl)-carbodiimide, N,N'-dicyclohexyl carbodiimide, 2,2',6,6'-tetraisopropyl diphenyl carbodiimide and poly-(2,2-diisopropyl)-p-phenylene carbodiimide.

The activators can advantageously also be dissolved in the solvating agent.

Preferably 0.4 to 1 mol of the activator is used per mol of lactamate. In this case the excess lactamate can serve to eliminate traces of residual moisture.

Property- and application-related additives (Z), which do not or only slightly interfere with polymerization, can be advantageously added to the finished liquid system. These are, for example, demoulding agents, defoamers, heat, light and/or oxidation stabilizers, nucleating agents, tracers, optical brighteners, plasticizers, impact resistance agents and colorants.

In accordance with the invention, the production of the liquid system takes place stepwise directly in the solvating agent, without it being necessary to separate the lactamate as a solid in an intermediate stage. The method can be exercised in many ways, depending on the initial materials selected.

The lactamate formation in solution can, for example takes place as follows:

Thereby care must be taken to assure that all components are carefully dried. Furthermore, it is necessary to work in a protective gas.

The solvating agent is placed in a reaction vessel which can be stirred and heated, and the lactam is dissolved at a suitable temperature. Subsequently the base is slowly added while stirring. If in this case sodium methylate dissolved in methanol is used, the alcohol added and being generated is advantageously continuously drawn off by the action of heat and vacuum, wherein following the end of the addition, the actions of vacuum and heat are still continued for a suitable time while stirring. Remaining amounts of alcohol can also be removed with the aid of an entraining agent such as, for example, tetrahydrofurane and vacuum action.

Particularly strong bases such as, for example, metal hydrides (for example NaH), or butyl lithium, or also Grignard compounds such as, for example, ethyl or butyl magnesium chloride or also sodium amide, are often used as solution, or as suspension in a oxidation protecting agent, or like in tetrahydrofurane or diethylether. The reaction products here are volatile at room temperature, and the strong bases used mostly react quite violently with the dissolved lactam. They are advantageously added to the stirred reaction mixture in portions. If a liquid oxidation protecting agent is used, it is subsequently removed by vacuum. It is alternatively also possible to proceed in such a way that for example the base is dissolved in the solvating agent or suspended therein, and thereafter the lactam is added while stirring, and the reaction products are drawn off by vacuum and if necessary also with the aid of an entraining agent. For example, solid magnesium ethylate can be suspended in the solvating agent, dimethylpropylene urea, and thereafter liquid lactam such as, for example, butyro-, valero- or oenantho-lactam can be continuously added, while the alcohol being formed is continuously removed by the application of vacuum and, if required, by the action of heat, wherein an entraining agent such as, for example, tetrahydrofurane, can additionally be used. The entraining and/or the solvating agent can also be added to the lactam, wherein it advantageously lowers the melting point of the lactam and therefore makes it easier to meter it in.

An example is lactam-6 which, with the addition of only a small fraction of dimethylpropylene urea, is liquid at room temperature.

In connection with the many possible variants of the method it is necessary to regulate the temperature, the vacuum and to select the entraining agent according to the components used. It is often advantageous to employ a solvating agent with a boiling point of at least 200° C., advantageously of at least 230° C., and in particular of 250° C. and higher, and to select the base in such a way that it can be easily removed from the reaction mixture after being neutralized.

It is of particular advantage in connection with the method in accordance with the invention for producing a liquid system for the direct initiation of the activated anionic lactam polymerization that it is possible to operate stoichiometrically, or respectively with a minimal stoichiometric surplus of lactam, which advantageously lies between 1 and 10 mol-%, so that the resultant liquid system contains practically no free lactam.

In contrast thereto, solid sodium lactamate is used in the prior art, which is composed of four parts of lactam-6 and only one part of the lactamate.

It is furthermore advantageous that no free base, which could adversely affect the storage stability of the system, is present in the liquid system in accordance with the invention.

A further advantage is that the catalyst as an intermediate product does not need to be isolated, and that the activator can be added directly to the freshly produced, catalyst-containing solution. In the process it is advantageously added, selectively as a solution, directly to the catalyst solution, which is kept of 70 to 120° C., for example, while stirring, whereby precipitation of the lactamate is prevented.

Thereafter the finished liquid system is cooled to room temperature, whereby it retains its low viscosity and remains stable in storage and can be used in this form for the direct initiation and execution of the polymerization of pure lactam.

The polymerization of the lactam melt can be directly initiated by using the liquid system in accordance with the invention in a continuous as well as a discontinuous process, wherein it is performed in a short time and polylactam of high quality and low extract, and, which has excellent mechanical properties, is formed.

Advantageously 0.5 to 15 weight-% of the liquid system is added to the lactam melt.

Specially suitable lactams are lactam-6 and lactam-12.

Thereby the use of the inventive liquid system for the polymerization of lactam-12 is of special interest, whereby polimerization can be performed in a wide temperature range between 170° C. to approximately 330° C., whereby the reaction speed can be very directedly set by the selection of the temperature ranges.

A further essential advantage is that it is possible through using the method of the invention to proceed directly from pure lactam which is stable in storage, and the separate production of a catalyst-containing and activator-containing lactam melt with its limited storage stability can be omitted. By means of this the lactam polymerization is greatly simplified and of cost-efficiency much improved.

The application of the liquid system in accordance with the invention is of particularly great advantage in extrusion-, injection molding-, pultrusion-, monomer casting-, resin transfer molding-, reaction-injection molding- and rotomolding-processes, as well as in the production of composit materials with polylactam as the matrix.

The method will now be explained in more detail by means of examples. These do not narrow the scope of the invention, but only represent a selection of the possibilities beeing now available.

DETAILED DESCRIPTION

For the production of the liquid system there are always used the minimum of one of solvating agent (S), Lactam (L), base (B), and substance activating the polymerization (A).

All these substances must be dried as thoroughly as possible. If residual moisture is present, this may lead to the formation of a portion of precipitation in the produced liquid system, which advantageously should be separated by decanting or filtration. If the amount of moisture as a whole is small, the polymerization of lactam after the addition of the liquid system is not essentially adversely affected. With a moisture content of the solvating agent, for example, of 0.1 to 1.0%, or by the use of insufficiently pure solvating agents which, for example, still contain alcoholic or phenolic OH or even NH-(Zerewitinoff H), polymerization can be greatly slowed down or completely prevented. This also applies if the alcohol from neutralization remains from the reaction insufficiently removed.

In the case of lab tests, weighing of the substances was therefore performed in a plexiglass box flooded with dry nitrogen and provided with rubber gloves and a lock.

For testing suitable combinations of the substances S, L, B and A for producing liquid systems in 100 g batches the procedure was as follows:

Solvating agent S was heated to approximately 80° C. and the lactam L dissolved therein. Thereafter, B (in most cases 30 weight-% of sodium methylate dissolved in methanol) was slowly added drop-by-drop and the alcohol, corresponding to the solvent proportion as well as to the reaction product from the neutralization reaction of the lactam, was continuously drawn off under the continuous action of a vacuum while stirring.

After the addition of the almost stoichiometric amount of alcoholate, the vacuum was maintained for approximately ½ hour while stirring, and the process temperature was increased to 80 to 140° C., depending on the activator A used.

After breaking the vacuum, the activator A was added drop-by-drop in dry nitrogen.

If A is a solid, such as for example in the case of many carbodiimides, mixing with a small amount of S (for example 25 to 30 weight-% in relation to A) and slight warming results in liquefaction, so that continuous addition drop-by-drop under a blanket of dry nitrogen and stirring can take place. During the addition of A, the reaction solution is maintained at 80 to 100° C., and this temperature is still maintained a further 10 minutes followed by cooling to room temperature. By this process a stable liquid system is formed, which directly initiates the lactam polymerization.

If a precipitation in a small amount is formed during cooling, this can be caused by traces of water and/or impurities of the components. After the precipitation has settled, decanting or filtration can be performed, but it is also possible to take out a test amount of the supernatant clear portion for checking the activity of the system. Tests have affirmed that using a system with a solid portion, polymerization in general is only to a hardly noticeable extent negatively affected. Examples of a 100 g scale are combined in Table 1.

The meaning of the abbreviations in Table 1 is as follows:

S: the solvent and solvating agent
L: the lactam
B: the base used for neutralization
A: the activator accelerating the lactam polymerization
DMPU: dimethylpropylene urea
DMI: dimethylethylene urea
NMP: N-methyl pyrrolidone
W300: diisotridecylphthalate
MPP: methoxypropyl pyrrolidone
BH: tetrabutyl urea
TEGDE: tetraethylene glycol dimethylether
LC-4, LC-5, LC-6: respectively the lactam with a 5-, 6- and 7-membered ring
NaM: sodium methylate
KM: potassium methylate
MgE: magnesium diethylate
NaN: sodium amide
DCC: dicyclohexyl carbodiimide
Lox: Tetrametylene-diisocyanate capped with ricinyloxazoline
IL-6: methylene diisocyanate capped with caprolactam
CD: Bis-(2,6-diisopropylphenyl) carbo-diimide

TABLE 1

| Ex No | S Type | Wt.-% | L Type | B Type | A Type | Mol ratio L:B:A | Remarks |
|---|---|---|---|---|---|---|---|
| 1 | DMPU | 80.33 | LC-6 | NaM | DCC | 1.06:1:1 | Clear liquid, |
| 2 | DMPU | 80.00 | LC-4 | NaM | Lox | 1.20:1.1:1 | red low viscosity liquid, brown, some precipitation |
| 3 | DMPU | 80.00 | LC-5 | NaM | Lox | 1.20:1.1:1 | idem |
| 4 | DMI | 80.33 | LC-6 | NaM | DCC | 1.05:1:1 | Clear yellow liquid |
| 5 | DMI | 74.2 | LC-6 | NaM | DCC | 1.05:1:1 | Clear slithly yellow liquid |
| 6 | NMP | 80.33 | LC-6 | NaM | DCC | 1.05:1:1 | Clear brown liquid |
| 7 | DMPU W300 | 40.23 40.00 | LC-6 | NaM | DCC | 1.05:1:1 | Clear brown liquid |
| 8 | NMP | 75.80 | LC-6 | NaM | DCC | 1.55:1.5:1 | Clear liquid, some precipitation after 1 day |
| 9 | NMP | 76.9 | LC-6 | NaM | DCC | 1.05:1.5:1 | Clear stable dark-red liquid, low viscous |
| 10 | DMPU MPP | 36.58 37.00 | LC-6 | NaM | DCC | 1.55:1:1 | Clear stable brown liquid |
| 11 | DMPU | 79.41 | LC-6 | KM | DCC | 1.05:1:1 | Clear stable brown liquid |
| 12 | DMPU | 74.16 | LC-6 | MgE | DCC | 1:1:1 | Clear yellow liquid |
| 13 | DMPU | 80.33 | LC-6 | NaN | DCC | 1.05:1:1 | liquid with some precipitation |
| 14 | DMPU | 85.33 | LC-6 | NaM | IL-6 | 1.05:1:1 | Clear dark-red liquid |
| 15 | DMPU | 71.35 | LC-6 | NaM | CD | 1.05:1:1 | Clear dark-red liquid |
| 16 | DMPU | 66.65 | LC-6 | NaM | Lox | 1.05:1:1 | Clear dark-red liquid |
| 17 | TEGDE | 80.00 | LC-6 | NaM | Lox | 1.30:1.2:1 | Brown liquid, some precipitation |
| 18 | W300 | 80.00 | LC-6 | NaM | Lox | 1.30:1.2:1 | Dark-red liquid, some precipitation |
| 19 | BH | 80.00 | LC-6 | NaM | Lox | 1.30:1.2:1 | Yellow liquid, some precipitation |

In Table 2 polymerizations tests of lactam-12 are summarized, whereby in all cases 3 weight-% of the respective liquid system are added.

Thereto, in each case 100 g lactam-12 were melted while stirring under a blanket of nitrogen atmosphere, and after the predetermined temperature was reached, the liquid system was added.

The first measured time $t_u$ is the time at which after activation of the lactam, the magnetic stirrer stops rotating. Following its quick removal, melt polymerization is performed during the predetermined time, t. The polymer is then cooled, comminuted and analyzed.

TABLE 2

Polymerization Behavior

| Ex. No. | FLS fr. Ex. | Polymerization Conditions T °C. | t Min. | $t_u$ Min | Analysis MP,DSC °C. | $\mu$rel 0,5% mK | Extract Weight-% |
|---|---|---|---|---|---|---|---|
| 20 | 1 | 200 | 20 | 3.5 | 178 | 2.60 | 2.4 |
| 21 | 2 | 200 | 20 | 1.0 | | 3.31 | |
| 22 | 3 | 200 | 20 | 0.5 | | 2.71 | |
| 23 | 4 | 200 | 20 | 3.5 | 177 | 2.50 | |
| 24 | 5 | 200 | 20 | 2.5 | 176 | 2.5 | |
| 25 | 6 | 200 | 20 | 4.0 | 176 | 2.53 | 3.33 |
| 26 | 7 | 200 | 20 | 5.0 | 172 | 2.10 | |
| 27 | 8 | 200 | 20 | 3.0 | | | |
| 28 | 9 | 200 | 40 | 4.2 | 176 | 2.80 | |
| 29 | 10 | 200 | 20 | 5.0 | 176 | 2.41 | |

TABLE 2-continued

Polymerization Behavior

| Ex. No. | FLS fr. Ex. | Polymerization Conditions T °C. | t Min. | $t_u$ Min | Analysis MP,DSC °C. | $\mu$rel 0,5% mK | Extract Weight-% |
|---|---|---|---|---|---|---|---|
| 30 | 11 | 200 | 20 | 3.5 | 175 | 2.15 | 6.10 |
| 31 | 12 | 240 | 30 | 16.0 | 164 | 2.17 | |
| 32 | 13 | 200 | 20 | 8.0 | 166 | 1.96 | |
| 33 | 14 | 170 | 60 | 0.13 | | nmb | |
| 34 | 15 | 200 | 20 | 0.50 | 177 | 2.55 | 4.60 |
| 35 | 16 | 200 | 20 | 0.07 | 172 | nmb | 4.30 |
| 36 | 17 | 200 | 20 | 0.13 | | nmb | |
| 37 | 18 | 200 | 20 | 3.5 | | nmb | |
| 38 | 19 | 200 | 20 | 1.0 | 178 | 1.83 | 3.40 |

The meaning of the abbreviations in Table 2 is as follows:
FLS: Liquid system
T: Temperature of the mass during polymerization
t: Total polymerization time
MP,DSC: Melting point maximum measured by means of the DSC method
$\mu$rel: Relative solution viscosity, measured as a 0.5 percent solution in metakresol
nmb: $\mu$rel very high, cannot be measured with conventional methods
Extract: Total extractable fraction on extraction with boiling methanol

EXAMPLES 39 TO 47 (TABLE 3)

These examples contain liquid systems based on DMPU as solvating agent (S) and are produced by means of the reaction of sodium methylate with caprolactam in DMPU and subsequent addition of carbodiimide, or respectively capped isocyanate. Production took place in accordance with the description in connection with Examples 1 to 19.

Storage stable, reddish-brown liquids resulted in all cases, with which the polymerization of lactam-12 can be performed with good reproducibility. Their viscosity depends on the proportion of the components S. For example, the product of test 45 is highly viscous, while the product in accordance with test 46 is of low viscosity. Viscosity can also easily be reduced by increasing the temperature. For practical use the products can be heated to 100° C., briefly even up to 130° C., without their reactivity being reduced, which clearly widens the possibilities of use of such systems

TABLE 3

Liquid Systems with DMPU as Solvating Agent

| Tst No. | S Type | Wt.-% | L Type | B Type | A Type 1 | Type 2 | Mol ratio | Mol ratio total L | B | A |
|---|---|---|---|---|---|---|---|---|---|---|
| 39 | DMPU | 66.25 | CL | NaM | CD | — | — | 1.005 | 1 | 0.667 |
| 40 | DMPU | 75.61 | CL | NaM | IL-6 | DCC | 0.05:0.95 | 1.005 | 1 | 0.667 |
| 41 | DMPU | 75.52 | CL | NaM | IL-6 | DCC | 0.10:0.90 | 1.005 | 1 | 0.667 |
| 42 | DMPU | 75.26 | CL | NaM | IL-6 | DCC | 0.25:0.75 | 1.005 | 1 | 0.667 |
| 43 | DMPU | 74.78 | CL | NaM | IL-6 | DCC | 0.50:0.50 | 1.005 | 1 | 0.667 |
| 44 | DMPU | 70.89 | CL | NaM | CD | DCC | 0.50:0.50 | 1.005 | 1 | 0.667 |
| 45 | DMPU | 62 | CL | NaM | CD | — | — | 1.005 | 1 | 0.4545 |
| 46 | DMPU | 68.3 | CL | NaM | CD | — | — | 1.005 | 1 | 0.4545 |
| 47 | DMPU | 76.3 | CL | NaM | IL-6 | DCC | 0.05:0.95 | 1.005 | 1 | 0.667 |

The polymerization behavior of lactam-12 during on addition of the liquid system from tests 39 to 47 is compiled in Table 4 as tests 48 to 56. For good comparison, 3 weight-% of the liquid system was added in all the tests A comparison of tests 48 to 51, and here in particular of the time $t_u$, shows that, the speed of the polymerization can be considerably affected by means of the mixture ratio of the components A.

A comparison of test 54 with test 48 further shows, that $t_u$ can also be affected by means of a variation of the mixture ratio B:A. When comparing test 46 with test 45, the proportion of the solvating agent is increased. The viscosity of the system is reduced by this. In the course of the corresponding polymerization tests 55 and 54, changes in the behavior could hardly be noticed.

In test 56 polymerization took place at 220° C. and at 240° C. while maintaining a total polymerization time of 5 and 3 minutes. The measured extract values prove that very rapid polymerization took place.

TABLE 4

Polymerization Behavior

| Ex. No. | FLS fr. Ex. | T °C. | t Min. | $t_u$ Min | MP °C. | $\mu$rel | Extract Weight-% |
|---|---|---|---|---|---|---|---|
| 48 | 39 | 170 | 60 | 2.5 | 173 | 2.61 | 3.70 |
| | | 240 | 7 | 0.4 | 174 | 3.47 | 3.15 |
| 49 | 40 | 170 | 40 | 1.5 | 173 | 2.53 | |

TABLE 4-continued

| | | Polymerization Behavior | | | | | |
|---|---|---|---|---|---|---|---|
| Ex. No. | FLS fr. Ex. | T °C. | t Min. | $t_u$ Min | MP °C. | $\mu$rel | Extract Weight-% |
| 50 | 41 | 170 | 40 | 0.5 | 174 | 2.37 | |
| | | 230 | 6 | 0.08 | 173 | 4.38 | |
| 51 | 42 | 170 | 40 | 0.08 | | | |
| 52 | 43 | 170 | 40 | 0.08 | | | |
| 53 | 44 | 170 | 60 | 3.0 | 175 | 2.55 | |
| | | 240 | 6 | 0.66 | 176 | 3.44 | 3.38 |
| 54 | 45 | 170 | 60 | 1.0 | 174 | 2.68 | |
| 55 | 46 | 170 | 60 | 1.0 | 175 | 2.49 | |
| 56 | 46 | 220 | 5 | | | | 2.88 |
| | | 240 | 3 | | | | 2.69 |

Complementary tests, not listed in detail, were performed with changed proportions of the liquid system. If in the course of this the proportion of the liquid system is reduced, for example to 1.5 weight-%, the polymerization takes place more slowly and simultaneously leads to higher molecular weights. If more liquid system is added, for example 5 weight-%, the polymerization takes place faster. At the same time the values of $\mu$rel are lower and therefore the molecular weight is reduced.

Test 57

For application tests, 40 kg of the liquid system were produced from sodium caprolactamate and DCC in DMPU, wherein sodium caprolactamate and DCC were added at a mol ratio of 1.5:1, and a very small lactam-6 excess was used.

Thereby, 4.15 kg lactam-6 were dissolved at 120° C. in DMPU, and subsequently 6.58 kg of a 30-percent sodium methylate solution were slowly added dropwise while stirring and applying a vacuum of approximately 230 mbar.

During that, methanol was continuously removed from the reaction mixture and the temperature of the liquid system droped to approximately 90° C.

At the end of the sodium methylate addition, the vacuum was increased to 50 mbar and maintained for further 30 minutes. It was then broken by means of dry nitrogen, and 4.740 kg of DCC, dissolved in DMPU, were added while stirring. Thereafter the reaction product was cooled to 65° C. and decanted into four 10 l polyethylene bottles. When adding 3 weight-% of the liquid system to a lactam-12 melt at 200° C. and maintaining a polymerization time of 15 minutes, a polyamide-12 with a melting point of 174° C., a $\mu$rel of 2.50 and a total extract of 2.5 weight-% results.

Test 58

Using the liquid system from Test 56, polymerization was directly performed from lactam-12 on a double-screw extruder, ZSK 30 of the Werner+Pfleiderer company, Stuttgart (Germany) bycontinuous metering of the system into the lactam melt.

For this, the twin screw extruder (l/d ratio 36) was provided with a special screw pair, which permits the metered addition of solid lactam in the form of flakes and its rapid melting, additionally continued metering-in and homogeneous admixing of the liquid system and thereafter continuously polymerization and conveyance of the polymer melt to the outlet nozzle. Degassing of the melt at several locations was complementarily provided.

The liquid system was continuously injected into the lactam melt by means of an oscillating reciprocating piston pump at a pressure of 15 to 20 Bar.

In order to allow injection at varying throughputs, three parts of the system were diluted with one part of pure DMPU. This system was given the designation FLS*.

Selected setting parameters of the test series with the double-screw extruder, as well as basic analysis data of the resulting products are shown in Table 5. Complementary to the test parameters mentioned, variations were made in the:

rotation speed from 100 to 200 rpm, throughput from 6.5 to 12.5 kg/h mass-temperature of the liquid system from 70 to 130° C.

concentration of FLS* from 3 to 6 weight-%, and temperature of the melt in the polymerization zone from 290 to 325° C.

In all cases, with the sole exception of the increased melt temperature, a smooth, almost transparent extrusion strand resulted which, after cooling and granulation, leads to granules which can beasely processed by injection molding and extrusion.

In all cases where the temperature of the mass was kept below 310° C. and the FLS* was employed in the amount of 4 weight-%, a solution viscosity of at least 2.30, a melting point of at least 273° C. and an extract of maximally 4.2 weight-% resulted, wherein it must be taken into consideration that components of the liquid system contribute essentially to the extract.

| | Test 5 | | | | | | |
|---|---|---|---|---|---|---|---|
| Setting No. Process Parameters | | 1 | 2 | 3 | 4 | 5 | 6 |
| Throughput | kg/h | 6.5 | 6.5 | 8.4 | 6.9 | 10.4 | 12.5 |
| Screw Speed | rpm | 100 | 100 | 100 | 100 | 150 | 100 |
| Temperature of the Polymerization and Conveying Zone | °C. | 290 | 300 | 290 | 290 | 290 | 290 |
| Torque | Nm | 28 | 22.4 | 26.4 | 25.6 | 24 | 24.8 |
| Amount of FLS* | Weight-% | 4 | 4 | 5 | 6 | 4 | 4 |
| Injection Temperature | °C. | 70 | 70 | 70 | 70 | 70 | 70 |
| Product Characterization | | | | | | | |
| MP(DSC) | °C. | 173 | 173 | 173 | 172 | 173 | 175 |
| $\mu$rel | 0.5% mKr | 2.57 | 2.32 | 2.26 | 2.08 | 2.75 | 2.50 |
| Extract(methanol) | Weight-% | 3.94 | 4.18 | 4.79 | 5.09 | 3.44 | 3.24 |

EXAMPLE 59

This example describes the production and application of a liquid system containing additional components Z in the form of heat and light stabilizers. Thereby a FLS of the composition in accordance with test 56 was prepared on a 100 g scale and, following the addition of the component A (respectively in relation to the resulting mass), 3 weight-% of Tinuvin 765 as the light stabilizer and 2 weight-% of Irganox 1135 as heat stabilizer were added, than cooling was performed and subsequently 4 weight-% of this system were added to 100 g of a stirred lactam-12 melt at 200° C. Polymerization took place in the customary manner. The stirrer stopped after 1.5 minutes. After a total polymerization time of 30 minutes the $\mu$rel was 2.527, the extract 3.18 weight % and the melting point 176.1° C.

EXAMPLES 59 TO 64

These examples related to the polymerization of caprolactam while using the liquid system from Test 56.

Well dried caprolactam of so-called monomer casting quality of the Dutch company DSM Fiber Intermediates BV was used and the tests performed under a blanket of dry nitrogen.

Respectively 100 g caprolactam were melted while being stirred by a magnetic stirrer, and different amounts by weight of the liquid system were added. The tests are compiled in Table 6. The abbreviations correspond to the ones in the legends of Tables 1 and 2.

As the test results prove, the liquid system produced in accordance with the method of the invention is excellently suitable for the polymerization of lactam-6.

TABLE 6

Polymerization of Caprolactam

| Ex. No. | Wt.-% FLS | T °C. | $t_u$ Min. | t Min. | MP °C. | $\mu$-rel | Extract Weight-% |
|---|---|---|---|---|---|---|---|
| 59 | 3 | 180 | 9.5 | 50 | 215.7 | 2.758 | 0.75 |
| 60 | 5 | 180 | 4.0 | 50 | 216.7 | 2.104 | 1.62 |
| 61 | 7 | 180 | 3.5 | 50 | 216.1 | 1.750 | 1.59 |
| 62 | 3 | 160 | 20 | 100 | 218.4 | 2.648 | 2.60 |
| 63 | 5 | 160 | 10.5 | 100 | 216.6 | 2.107 | 1.91 |
| 64 | 7 | 160 | 7.5 | 100 | 215.9 | 1.821 | 2.19 |

EXAMPLES 65 TO 73

In the following table 7 further trials are summarized. Thereby occasionally additional activator molecules A, are used and the weight fraction of the solvating agent selected in such a manner that 0.5–3.0 parts of the corresponding system, added to 100 parts (weigth each) of molten lactam-12, are sufficient to initiate and to perform its rapid and complete polimerization.

The meanings in table 7 are:
Components: the raw-materials used for the synthesis
Comp. Molar-ratio: their molar-ratio used in the synthesis
S, weight-%: The weight-fraction of solvating agent of the system
The blocks *Polymerization Conditions* and *Analysis* have the same meaning as in table 2.
LS, Parts: the weight-fraction of Liquid-System that is added to the lactam-12 melt to initiate and perform its polymerization.
For components A the meaning are:
TPC: Tripropylisocyanurate
TMI: The Isocyanate of formula:

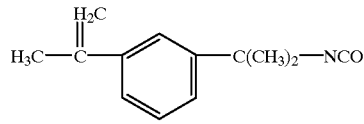

PHI: Phenylisocyanate

In example 65, 66, and 67 the weight-part of S is varied, whereby example 65 contains less than 50 weight-% of solvating agent. Already at an addition of 1.13 weight-% of system 65 to the lactam melt a very good polymerization-behaviour can be observed.

From the system of example 66, 0.5–10 weight-% is added to the lactam-12 melt. Thereby it becomes visible that at low addition levels. Polymerization is slow but leads to very high molecular weights, whereby at high addition levels polimerization is fast, whereby low molecular weights results.

In the examples 68–73 isocyanurate (TPC) and isocyanates were used as activator molecules. In example 68 2 parts of sodiumcoprolactamate (NaC) per TPC were used. Adjacent trials prove that the ratio of NaC to TPC can be easely varied in the range of 1 to 3, whereby the range of 2–3 is specially suitable.

As the values of $t_u$ prove, the liquid systems, based on isocyanates, are all fast in the initiations phase of the lactam polimerization. This may be caused by the fact that in the solvating agent the lactamate, NaC, reacts completely with the isocyanate.

Additionally it has to be mentioned that in the case of the production of isocyanate based liquid-systems, it is possible to start directly from capped, especially lactam-capped, isocyanates.

Thereby the isocyanate can at the beginning be dissolved in the solvating agent followed by addition of the base, expl. NaM, generally in a molar-ratio, based on isocyanate of 1:1, and followed by removing completely the neutralization product of the base and optionally the solvent for the base, e.g. methanol. After cooling down to room-temperature the system is ready and can be used.

The isocyanate based systems act in general as fast systems for the lactam polymerization. Thereby the TPC-based system is of light color and leads to pure white polylactam.

All these systems are specially suited for cases where the resulting melt is continuously mixed and conveyed, for example in a continuous polymerizations process, such as in a double-screw extruder.

TABLE 7

| Ex No | Components | | | | S Wt % | Comp., Molar-ratio | | | Polymerizations Cond. | | | | Analyses results | | |
|---|---|---|---|---|---|---|---|---|---|---|---|---|---|---|---|
| | S | L | B | A | | L | B | A | LS Parts | T °C. | $T_u$ Sek | t Min. | MP, DSC °C. | $\eta_{rel}$ 0.5% mK | Extract Wt. % |
| 65 | DMPU | LC-6 | NaM | DCC | 48.7 | 1.10 | 1.05 | 1 | 1.13 | 200 | 118 | 25 | 176.9 | 2.244 | 4.19 |
| 66 | DMPU | LC-6 | NaM | DCC | 61.2 | 1.10 | 1.05 | 1 | 0.50 | 200 | 630 | 160 | 173.8 | 4.790 | |
| | | | | | | | | | 1.00 | 200 | 235 | 60 | 175.8 | 3.044 | |
| | | | | | | | | | 1.50 | 200 | 150 | 32 | | 2.506 | 1.77 |
| | | | | | | | | | 2.00 | 200 | 135 | 27 | | 2.207 | 1.77 |
| | | | | | | | | | 3.00 | 200 | 90 | 23 | | 1.976 | 1.20 |
| | | | | | | | | | 5.00 | 200 | 40 | 10 | 177.0 | 1.571 | |
| | | | | | | | | | 10.00 | 200 | 10 | 3 | 174.1 | 1.356 | |
| 67 | DMPU | LC-6 | NaM | DCC | 70.0 | 1.10 | 1.05 | 1 | 1.93 | 200 | 100 | 25 | 175 | 2.501 | |
| 68 | DMPU | LC-6 | NaM | TPC | 85.1 | 2.10 | 2.00 | 1 | 1* | 200 | 20 | 60 | 170 | 6.90 | |
| 69 | DMPU | LC-6 | NaM | TMI | 75.2 | 1.10 | 1.05 | 1 | 1* | 200 | 25 | 60 | 170 | nmb | |
| 70 | DMPU | LC-6 | NaM | PHI | 74.8 | 1.10 | 1.05 | 1 | 1* | 200 | 15 | 60 | 174 | 4.9 | |
| 71 | NMP | LC-6 | NaM | PHI | 66.9 | 1.10 | 1.05 | 1 | 1* | 200 | 7 | 60 | 174 | 4.1 | |
| 72 | DMPU NMP | LC-6 | NaM | TMI | 21.6 50.0 | 1.10 | 1.05 | 1 | 1* | 200 | 5 | 60 | 173 | 6.9 | |
| 73 | NMP | LC-6 | NaM | TMI | 77.8 | 1.10 | 1.05 | 1 | 2* | 200 | | 60 | 173 | 2.0 | |

*For a quick and homogenous mixing, the system is prediluted with 4 parts of DMPU.

What is claimed is:

1. A method for producing a catalytically-acting liquid system to initiate and perform anionic lactam polymerization, wherein
in at least one liquid, polar, aprotic solvating agent (S), which will not undergo a condensation reaction,
a composition is formed which at the same time acts as a catalyst and an activator,
by variation of temperature, under inert gas atmosphere and with exclusion of moisture by the steps of
  a. dissolving at least one lactam (L) in the solvating agent (S),
  b. adding at least one strong base (B) and reacting it with the at least one lactam (L) to form lactamate,
  c. adding at least one activator (A) and reacting it with the lactamate,
  d. cooling down the reaction product.

2. The method for producing a liquid system in accordance with claim 1, wherein
the lactam (L) and the base (B) are used in stoichiometric proportions, or with a lactam surplus of 1 up to maximally 10 mol-%.

3. The method for producing a liquid system in accordance with claim 1, wherein
said at least one base (B) and/or said at least one activator (A) is added in a solvent, or in suspended form, to said lactam (L).

4. The method for producing a liquid system in accordance with claim 1, wherein
solution and/or suspension agents for the base (B) and, optionally, neutralization products of the base (B), are removed in a vacuum and by the action of heat.

5. The method for producing a liquid system in accordance with claim 1, wherein
additives (Z) are added in any arbitrary process step.

6. The method for producing a liquid system in accordance with claim 1, wherein
the solvating agents (S) are polar aprotic compounds, which are selected from the group consisting of etherized polyols, esterified polyglycols, liquid phthalic acid esters, N-alkylized urea compounds, N-alkylized carboxylic acid amides and their mixtures.

7. The method for producing a liquid system in accordance with claim 1, wherein
the solvating agent is a tetraalkyl urea, selected from the group consisting of tetramethyl urea, tetraethyl urea, and tetrabutyl urea, or has a cyclic structure in accordance with the formula I

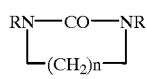

wherein R is an alkyl radical, and n=2 or 3.

8. The method for producing a liquid system in accordance with claim 7, wherein
R is a methyl radical.

9. The method for producing a liquid system in accordance with claim 1, wherein
the lactam (L) has a 5- to 13-membered ring.

10. The method for producing a liquid system in accordance with claim 1, wherein
the lactam (L) has a 5- to 7-membered ring.

11. The method for producing a liquid system in accordance with claim 1, wherein
the lactam (L) is caprolactam.

12. The method for producing a liquid system in accordance with claim 1, wherein
the cation of the base (B) is alkali-, alkaline earth or tetraalkyl-ammonium.

13. The method for producing a liquid system in accordance with claim 1, wherein
the base (B) is an alcoholate, an amide, a hydride, an alkylanion or a Grignard compound.

14. The method for producing a liquid system in accordance with claim 1, wherein
the base (B) is an alkali ethylate, an alkaline earth ethylate, an alkali methylate or an earth alkali methylate.

15. The method for producing a liquid system in accordance with claim 6, wherein
the base (B) is added as a solution, suspension or in the form of a fine solid particles.

16. The method for producing a liquid system in accordance with claim 1, wherein
the activator is at least one compound selected from the group consisting of carbodiimides, polycarbodiimides, monoisocyanates or diisocyanates.

17. The method for producing a liquid system in accordance with claim 16, wherein the mono- or diisocyanate has an aliphatic, cycloaliphatic, aliphatic-aromatic or aromatic base structure.

18. The method for producing a liquid system in accordance with claim 16, wherein the base structure of the isocyanate is that of toluene, isophoron, xylene, diphenylmethane, hexane or cyclohexane.

19. The method for producing a liquid system in accordance with claim 16, wherein the monoisocyanates and diisocyanates are capped with a compound selected from the group consisting of lactams and hydroxy alkyloxazolines.

20. The method for producing a liquid system in accordance with claim 16, wherein the carbodiimide is selected from the group consisting of N,N'-dicyclohexyl carbodiimide, N,N'-diisopropyl carbodiimide, N,N'-di-(o-tolyl)-carbodiimide, 2,2',6,6'-tetraisopropyl diphenyl carbodiimide and poly-(2,2-diisopropyl)-p-phenyl carbodiimide.

21. The method for producing a liquid system in accordance with claim 1, wherein 0.4 to 1 mol of an activator (A) per mol of lactamate (L) is added.

22. The method for producing a liquid system in accordance with claim 5, wherein the additives (Z) are property- and application-related additives, selected from the group consisting of mold release agent, antifoaming agent, stabilizer, nucleating agent, tracer, optical brightener, plasticizer, impact resistance modifier and colorant.

23. The method for producing a liquid system in accordance with claim 1, wherein by means of temperature variation the individual reaction steps are performed at temperatures between 70 and 130° C.

24. The method for producing a liquid system in accordance with claim 1, wherein the solvating agent (S) has a boiling point in the range of 80 to 330° C.

25. The method for producing a liquid system in accordance with claim 1, wherein the solvating agent (S) has a boiling point in the range of 80 to 160° C.

26. The method for producing a liquid system in accordance with claim 1, wherein the solvating agent (S) has a boiling point of at least 200° C.

27. The method for producing a liquid system in accordance with claim 1, wherein the solvating agent (S) is a mixture of at least one component with a high boiling point and at least one component with a low boiling point.

28. The method for producing a liquid system in accordance with claim 1, wherein the base (B) and/or the activator (A) are dissolved in the solvating agent (S).

29. The method of claim 1, for initiating and performing polymerization of a polymerizable lactam in a continuous or discontinuous process, further comprising mixing said liquid system with said polymerizable lactam.

30. The method of claim 29, comprising adding of 0.5 to 15 weight-% of the liquid system into the lactam melt.

31. The method of claim 29, comprising the adding of the liquid system into a melt of lactam-6, lactam-12 or their mixture.

32. The method of claim 29, comprising adding of the liquid system, to a lactam melt, in a discontinuous or continuous polymerization process selected from the group consisting of monomer casting, extrusion, injection molding, rotation molding or pultrusion for producing parts or composites with a matrix of polylactam.

33. The method according to claim 1 wherein said solvating agent (S) is sufficiently heat-resistant to be used as a reaction medium for the lactamate formation and subsequent reaction with the activator, has a sufficiently high boiling point so as not to cause bubble formation in a lactam melt during subsequent use of the liquid system for initiating lactam polymerization, and dissolves a compound formed of metal lactamate and activator at room temperature.

34. The method of claim 33, wherein said lactam (L) is used in excess relative to said base (B).

35. The method of claim 34 wherein said activator (A) is added in an amount of 0.4 to 1 mol per mol of lactamate.

36. The method according to claim 35 wherein said lactam (L) is caprolactam.

* * * * *